United States Patent [19]

Prowant

[11] Patent Number: 4,776,527

[45] Date of Patent: Oct. 11, 1988

[54] PORTABLE FISHING LINE SPOOL HOLDER APPARATUS FOR FEEDING FISHING REELS

[76] Inventor: John J. Prowant, Box 413, River Rd., New Columbia, Pa. 17856

[21] Appl. No.: 31,653

[22] Filed: Mar. 30, 1987

[51] Int. Cl.⁴ .................................................. A01K 89/00
[52] U.S. Cl. ................................ 242/106; 242/129.51; 43/25
[58] Field of Search ............. 43/25; 242/129.51, 55.2, 242/84.5 R, 106

[56] References Cited

U.S. PATENT DOCUMENTS

| | | | |
|---|---|---|---|
| 423,793 | 3/1890 | Milstead | 242/129.51 |
| 1,182,523 | 5/1916 | Benson | 43/27.4 |
| 2,848,778 | 8/1958 | Plummer, Sr. et al. | 24/243 |
| 3,026,059 | 3/1962 | Dennler | 242/84.5 R |
| 3,506,213 | 4/1970 | Young | 242/84.1 R |
| 3,679,151 | 7/1972 | Rice | 242/85 |
| 3,831,869 | 8/1974 | Sartori | 242/129.51 X |
| 3,951,354 | 4/1976 | Bagby | 242/129.8 |
| 3,973,741 | 8/1976 | Dean | 242/84.1 R |
| 4,034,930 | 7/1977 | Stevenson | 242/106 |
| 4,126,279 | 11/1978 | Munnekehoff | 242/129.51 X |
| 4,360,172 | 11/1982 | Cope | 242/129.8 |

*Primary Examiner*—Nicholas P. Godici
*Assistant Examiner*—Carmine Cuda
*Attorney, Agent, or Firm*—Ferrill and Logan

[57] ABSTRACT

A portable fishing line spool holder device is provided which mounts on all forms of fishing poles and feeds all forms of fishing reels, including spinning and casting reels. The spool holder avoids common problems of improper line tension and kinking of the line during transfer.

9 Claims, 2 Drawing Sheets

PORTABLE FISHING LINE SPOOL HOLDER APPARATUS FOR FEEDING FISHING REELS

BACKGROUND OF THE INVENTION

The present invention relates to the field of fishing accessories and, more particularly, to apparatus for assisting in winding fishing line onto fishing reels.

A common problem for fishing enthusiasts is the process of winding fishing line onto a fishing reel. Traditionally this has required two people—one to hold a spool of replacement line and to attempt to maintain constant tension on the line, and another to reel in the new line. This process proved unsatisfactory due to the need for assistance whenever a new line had to be wound, and the difficulty in maintaining a constant tension on the line during rewinding.

Accordingly, a number of devices were developed which permitted unassisted rewinding of certain fishing reels. These have taken the form of non-portable bench top devices, such as disclosed in U.S. Pat. No. 4,360,172, and portable devices to be mounted on fishing poles, such as disclosed in U.S. Pat. Nos. 2,848,778, 3,506,213, 3,973,741, and 4,034,930. Although each of the presently known devices may function reasonably well, they are each deficient in one or more respects.

The most glaring problem with the portable devices is their limited field of use. Fishing line stored on a spool tends to develop a set bias. If a reel is wound in a direction different from this bias, the line will tend to kink and tangle. Each of the portable devices disclosed in the above patents has a set orientation in which it holds the spool of line. Accordingly, these devices can properly feed only one type of reel without encountering tangling problems (i.e. spinning reels receive line around a reel with an axis parallel to the rod, casting reels receive line around a reel with an axis perpendicular to the rod). This is because a reel receiving line in the orientation established by the spool must be identically aligned with the spool during transfer.

This problem is addressed and solved in U.S. Pat. No. 4,360,172 by changing the orientation of the spool to correspond with the orientation of the reel. However, that device is not portable and must be permanently mounted. Thus, it lacks the convenience of the portable devices.

Other drawbacks with certain of the portable devices are that some are unduly bulky and/or complicated, some are not universally adaptable to all forms of fishing poles, and some provide little or no control over the degree of tension applied to the spool.

In light of the foregoing, it is a primary object of the present invention to create a portable fishing line winding device which can be adapted to feed properly all forms of fishing reels.

It is a further object of the present invention to provide a portable fishing line winding device which is of simple construction and stores readily in a tackle box, may be readily used on all forms of fishing poles, and provides straightforward means to adjust the tension on the fishing line.

SUMMARY OF THE INVENTION

The present invention provides a spool holder to aid the transfer of fishing line from a standard spool of fishing line to a fishing reel. The spool holder comprises a spool holding yoke rotatably connected to a mounting bracket.

The yoke contains two arms which each support a shaft. The two shafts oppose each other to form an axle for the fishing line spool. Access to the fishing line spool is provided by a hinged connection of one of the arms to the yoke, allowing the arm to pivot away from the yoke so the spool can be readily changed. Adjustable spring means are provided to hold the pivoted arm in position during operation and to create a drag on the spool so to furnish a suitable tension on the line received on the fishing reel.

The mounting bracket provides two members which form a channel to surround a fishing pole intermediate its ends. A bolt and nut secure the two members around the fishing pole and secure the yoke to the mounting bracket. A series of corresponding tongues and grooves on the abutting surfaces of the yoke and the mounting bracket assist in maintaining the orientation of the yoke during operation. The orientation of the yoke relative to the mounting bracket is readily changed by loosening the nut and resituating the tongues and grooves. This allows the spool of fishing line to be oriented during transfer in the same position as any given fishing reel. The result is a spool holder which can feed both spinning type and casting type reels without tangling or kinking the fishing line.

The present invention's simple construction provides all the features desired in a fishing line spool holder: ability to feed at adjustable tensions all forms of fishing reels, ability to mount on all forms of fishing poles, ease of use, and complete portability.

DESCRIPTION OF THE DRAWINGS

The operation and features of the present invention should become apparent from the following description when considered in conjunction with the accompanying drawings, in which.

DETAILED DESCRIPTION OF THE INVENTION

The present invention provides a unique fishing line spool holder 10 for winding all forms of fishing reels.

Figure 1:
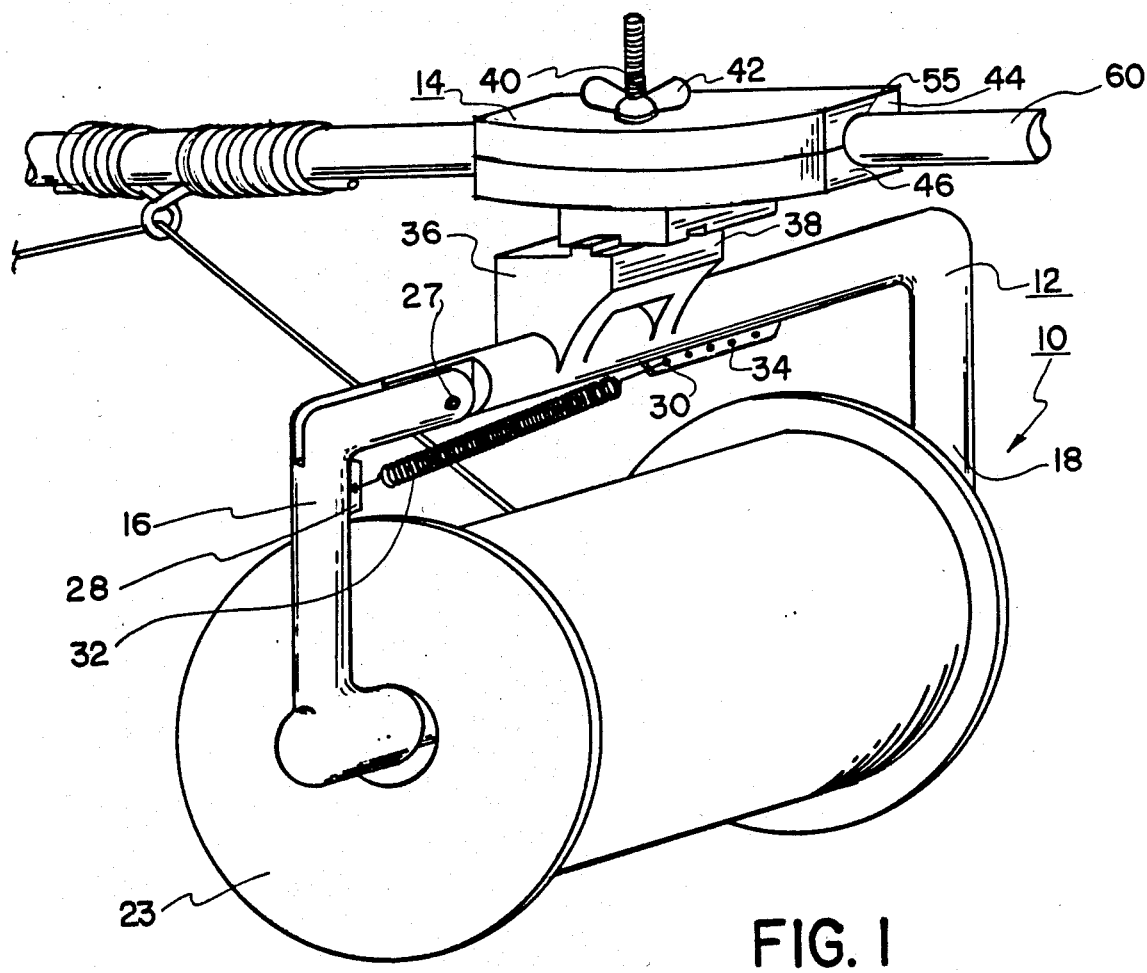
FIG. 1 is a three-quarters view of the present invention attached to a fishing pole.
Figure 2:
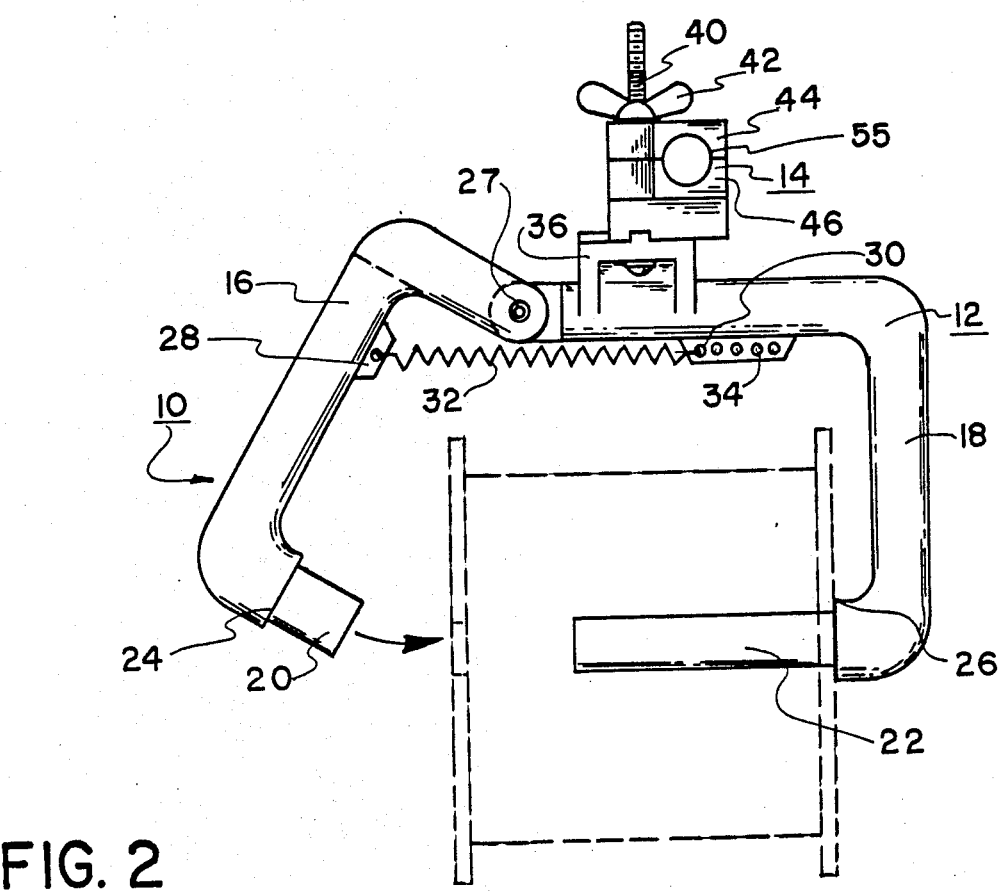
FIG. 2 is a planar view of the present invention with its pivoted arm in an open position.

As is shown in FIGS. 1 and 2, the spool holder 10 has two basic components: a yoke 12 and a mounting bracket 14. The yoke 12 is generally C-shaped having two arms 16, 18. The two arms 16, 18 support a pair of opposed stub shafts 20, 22. The shafts 20, 22 form an axle to support a standard spool of fishing line 23. At the abutment between each of the arms 16, 18 and each of the shafts 20, 22, said shafts 20, 22 being of a smaller circumference than said arms 16, 18, a flange 24, 26 is presented.

One of the arms 16 is connected to the yoke 12 at a hinge 27. This permits the arm 16 and the attached shaft 20 to pivot away from and expose a non-pivoting portion of the yoke 12, which non-pivoting portion supports shaft 22. Once arm 16 is pivoted, access to shaft 22 is unobstructed, permitting ready insertion and removal of spools of fishing line. The pivoting of arm 16 also provides a mechanism to produce a drag on the spool so that the fishing line may be wound at a proper tension.

Pivoted arm 16 is provided with an anchor 28. An additional anchor 30 is provided on the non-pivoting portion of the yoke 12. A spring 32 attaches between the two anchors 28, 30 to produce an inward bias on the pivoted arm 16. The inward bias accomplishes two important functions: it helps to retain the spool on the shafts 20, 22, and it forces the flanges 24, 26 into contact against the spool, thus producing a drag on the spool.

Through correct sizing of the spring 32, a sufficient drag can be placed on the spool to assure proper tension of the line wound onto the fishing reel. Different sized springs 32 may be employed to assure correct tension on any given fishing reel. Further adjustment of tension may be accomplished by providing extra anchors 34 on the yoke 12. The extra anchor 34 may provide different tension either by changing the distance the spring 32 must stretch or by changing the leverage of the spring 32 on the pivoted arm 16. Said spring 32 may be any known resilient device, including an elastic band and a coiled wire or plastic strand. Spacer washer, not shown, may be provided on the shafts 20, 22 to accommodate different shape and size spools.

Integral with the yoke 12, opposite the shafts 20, 22, is a cap 36. The cap 36 is wider than the C-shaped portion of the yoke 12, producing an overhanging lip 38. The yoke 12 attaches to the mounting bracket 14, by passing a bolt 40 through the mounting bracket 14 and the lip 38 and securing the bolt 40 in place with a nut 42. A wing nut is preferred as the nut 42 because it allows ready adjustment.

Figure 3:
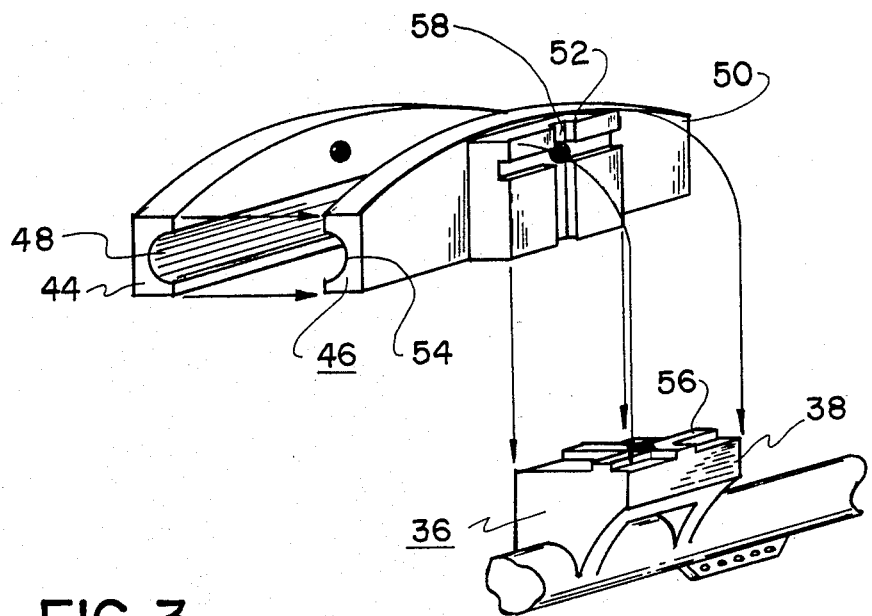
FIG. 3 is an exploded view of a mounting bracket of the present invention oriented for a spinning-type reel.
Figure 4:
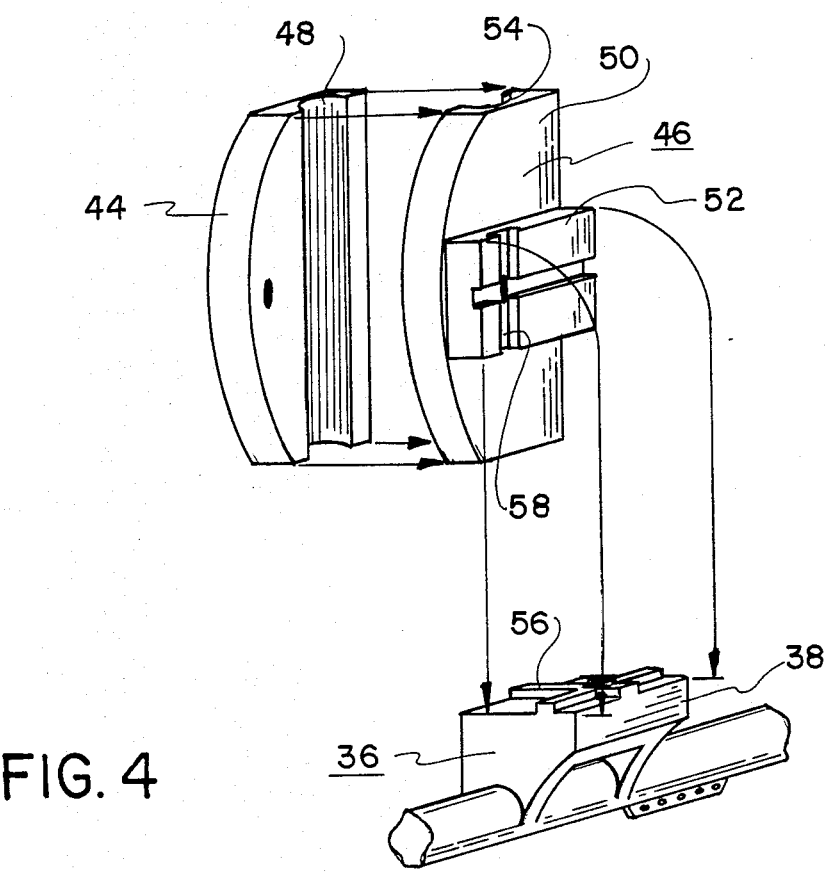
FIG. 4 is an exploded view of a mounting bracket of the present invention oriented for a casting-type reel.

As is shown in FIGS. 3 and 4, the mounting bracket 14 is constructed of two members 44, 46. Member 44 is generally rectangular in shape and has a semi-cylindrical channel 48 formed in one side. Member 46 has a generally rectangular top portion 50 and a truncated T-shaped base 52. Top portion 50 has a semi-cylindrical channel 54 which complements semi-cylindrical channel 48 to form a cylindrical channel 55 when member 44 and member 46 are placed together. Base 52 abuts the cap 36 when the mounting bracket 14 is attached to the yoke 12.

The cylindrical channel 55 is provided to surround a fishing pole 60 intermediate its ends and attach the mounting bracket 14 to the fishing pole 60. This method of attachment permits the mounting bracket 14 to be attached to all forms and all sizes of fishing poles. The members 44, 46 may be attached around the fishing pole through any form of locking means, including a nut and bolt, a hinge and catch, and multiple latches. In the preferred embodiment, simplicity is achieved by passing bolt 40 through members 44, 46, to retain them around a fishing pole, as well as through cap 36. Nut 42 then serves both to secure the members 44, 46 around the fishing pole and to secure the mounting bracket 14 to the yoke 12.

It is an important purpose of the present invention to permit it to feed fishing line onto all forms of fishing reels. Spinning type reels have their axis aligned generally parallel to the fishing pole. Casting type reels have their axis aligned generally perpendicular to the fishing pole. In order to transfer the bias found in fishing line stored on a spool and to avoid tangling of the line, the spool holder 10 must be aligned parallel to the receiving reel. In the present invention, alignment of the spool of fishing line is readily accomplished by merely loosening nut 42 and rotating yoke 12 into the desired orientation. To assist in maintaining the orientation of the yoke 12 during transfer, the surfaces of cap 36 and base 52 should be textured where they abut to resist turning. It has been found that corresponding tongues 56 and grooves 58 formed in the cap 36 and the base 52 at set positions, such as at right angles (as shown), perform very well. To change orientation of the yoke 12 using tongues 56 and grooves 58, the nut 42 is loosened sufficiently so that the tongues 56 may be fully disengaged from the grooves 58. The yoke 12 is then reoriented, with each of the tongues 56 aligning with a new set of grooves 58, and the nut 52 is again tightened.

The design of the present invention makes it very compact. When the channel 55 in the mounting bracket 14 is aligned parallel with the shafts 20, 22, the spool holder 10 will lie flat and require very little room in a tackle box. This makes the spool holder 10 very portable and very accessible. The device may be constructed from any known material, but injection molded hard plastics are preferred due to their strength and light weight.

While particular embodiments of the present invention have been disclosed herein, it is not intended to limit the invention to such a disclosure and changes and modifications may be incorporated and embodied within the scope of the following claims.

What is claimed is:

1. Apparatus detachably mountable on a fishing pole for winding fishing line from a spool to a fishing reel, including casting type and spinning type reels, comprising:

a yoke rotatably attached to a mounting bracket about an axis perpendicular to the pole, having corresponding interlocking means on said yoke and said mounting bracket to maintain the orientation of said yoke in one of a plurality of positions with respect to said mounting bracket and means to secure said interlocking means in contact with one another to prevent rotation about said axis;

said yoke supporting a pair of opposite shafts which form an axle for said spool; having at least one pivoted arm supporting one of the shafts, said pivoted arm adapted to be displaced to permit replacement of said spool; and having means to maintain the pivoted arm shaft within said spool during winding and create a constant tension upon said spool; and said mounting bracket having at least two members forming a channel to surround said pole intermediate the ends of said pole, and having means to secure said members around said pole.

2. Apparatus in accordance with claim 1 wherein the means to secure said interlocking means in contact with one another is a bolt, passing through a portion of said yoke and said mounting bracket, and an adjustable nut.

3. Apparatus in accordance with claim 2 wherein the means to secure said members around said pole is the bolt and the adjustable nut, which bolt passes through said members and which nut secures them against said pole.

4. Apparatus in accordance with claim 1 wherein the means to maintain the pivoted arm shaft within said spool during winding and create a constant tension upon said spool is a spring attached between an anchor on said pivoted arm and an anchor on a non-pivoting portion of said yoke.

5. Apparatus in accordance with claim 4 wherein means are provided to adjust the tension applied to said pivoted arm.

6. Apparatus in accordance with claim 5 wherein the means to adjust the tension is the substitution of springs of different sizes.

7. Apparatus in accordance with claim 5 wherein the means to adjust the tension is providing plural anchors to allow changing said spring's orientation.

8. Apparatus in accordance with claim 1 wherein the means to secure said members around said pole is a bolt passing through said members and secured by a nut.

9. Apparatus in accordance with claim 1 wherein the interlocking means to maintain the orientation of said yoke in one of a plurality of positions with respect to said mounting bracket is a combination of corresponding tongues and grooves in said yoke and said mounting bracket.

* * * * *